United States Patent
Verstraelen et al.

(10) Patent No.: US 7,995,985 B2
(45) Date of Patent: Aug. 9, 2011

(54) WIRELESS SECURITY MESSAGING MODEL

(75) Inventors: Johannes Gertrudis Raymundus Verstraelen, Sint Odilienberg (NL); Jacobus Robertus Andreas van Cann, Herkenbosch (NL)

(73) Assignee: UTC Fire & Security Americas Corporation, Inc., Bradenton, FL (US)

( * ) Notice: Subject to any disclaimer, the term of this patent is extended or adjusted under 35 U.S.C. 154(b) by 723 days.

(21) Appl. No.: 11/967,748

(22) Filed: Dec. 31, 2007

(65) Prior Publication Data
US 2009/0068977 A1    Mar. 12, 2009

Related U.S. Application Data

(60) Provisional application No. 60/971,113, filed on Sep. 10, 2007.

(51) Int. Cl.
*H04B 1/16* (2006.01)

(52) U.S. Cl. ............... 455/343.1; 455/436; 455/574; 455/464; 455/69; 455/41.1; 370/310

(58) Field of Classification Search ............ 455/343.1, 455/436, 574, 464, 69, 41.1; 370/310
See application file for complete search history.

(56) References Cited

U.S. PATENT DOCUMENTS

| | | | |
|---|---|---|---|
| 7,787,821 B2 * | 8/2010 | Hamaguchi | 455/41.1 |
| 2002/0113735 A1 * | 8/2002 | Spratt | 342/464 |
| 2006/0276161 A1 * | 12/2006 | Twitchell | 455/343.1 |

* cited by examiner

*Primary Examiner* — Sanh D Phu
(74) *Attorney, Agent, or Firm* — Kinney & Lange, P.A.

(57) ABSTRACT

Reducing power consumption and interference in wireless communication is provided. For example, in one embodiment, a method is provided that listens for radio frequency ("RF") activity on a receiver utilizing a first receiver antenna. When no RF activity is detected the receiver is switched "on" and a command is transmitted. If a reply to the transmission is not received the receiver is turned "off." After an expiration of time, the receiver is again switched "on" and another command is transmitted on a second antenna coupled to the receiver. Thereafter, if a reply is not received the receiver is again turned "off." Embodiments of the invention also include other methods, computer-readable mediums, apparatuses, and systems that contain features similar to the features in the above described method.

7 Claims, 5 Drawing Sheets

WIRELESS SECURITY MESSAGING MODEL

CROSS-REFERENCE TO RELATED APPLICATIONS

This application claims benefit of U.S. Provisional Patent Application Ser. No. 60/971,113, filed Sep. 10, 2007, which is herein incorporated by reference.

BACKGROUND OF THE INVENTION

1. Field of the Invention

Embodiments of the present invention generally relate to security systems and more particularly, to methods, computer-readable mediums, apparatuses, and systems for reducing keypad power consumption.

2. Description of the Related Art

In a wireless security system, when the radio frequency ("RF") signaling strength between a wireless transmitter and a wireless receiver is sufficient, the collision of messages between wireless components of the system is one of the most critical and limiting factors in the performance of the system. Collisions cause supervisory messages and sometimes alarm messages to be lost, cause a slow system response and practically limit the number of wireless components in a system.

Simple wireless security systems, using transmitters in the sensors and a receiver at the main control panel cannot detect a collision. Consequently these systems transmit a message multiple times, thereby increasing bandwidth usage, increasing the probability of message corruption by a collision, decreasing battery life and decreasing system response time.

Therefore, there is a great need in the art for a wireless security keypad having an improved battery life.

SUMMARY OF THE INVENTION

The present invention generally relates to security systems and more particularly, to methods, computer-readable mediums, apparatuses, and systems for reducing keypad power consumption.

For example, in one embodiment, the method uses an algorithm known as Listen Before Talk ("LBT"), which prevents the start of a transmission while some other component is already transmitting, thus preventing a collision of messages with the other transmitting component. This is also known as Collision Avoidance ("CA").

In various embodiments, an algorithm dynamically adjusts (i.e., increases or decreases) the emitted power level of the transmission based on the received signal strength ("RSSI") and link quality measurement of the previous correct received message at the receiving end. An acknowledgement message contains an indication of the signal quality as received by the receiving end, by which indicated signal quality the transmitting end adjusts it's output power for the next transmission to occur.

Other embodiments are also provided in which a computer-readable mediums, apparatuses, and a systems perform similar features recited by the above methods.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION

In the following description, numerous specific details are set forth to provide a more thorough understanding of the invention. As will be apparent to those skilled in the art, however, various changes using different configurations may be made without departing from the scope of the invention. In other instances, well-known features have not been described in order to avoid obscuring the invention. Thus, the invention is not considered limited to the particular illustrative embodiments shown in the specification and all such alternate embodiments are intended to be included in the scope of this invention. For example, aspects disclosed herein are described as using transmission of "status request messages" for sending commands (e.g., key presses from the keypad to the panel). However, this disclosure is not limited to sending status request messages. Neither is the described method limited to keypads and IO devices. In various embodiments, the material disclosed herein can utilize sensors and/or other wireless components in the system. Further, when such a component has only a single antenna, rather than the keypad using two antenna's, various embodiments of the invention utilize antenna 1 (see FIG. 4 and the description below).

Figure 1:
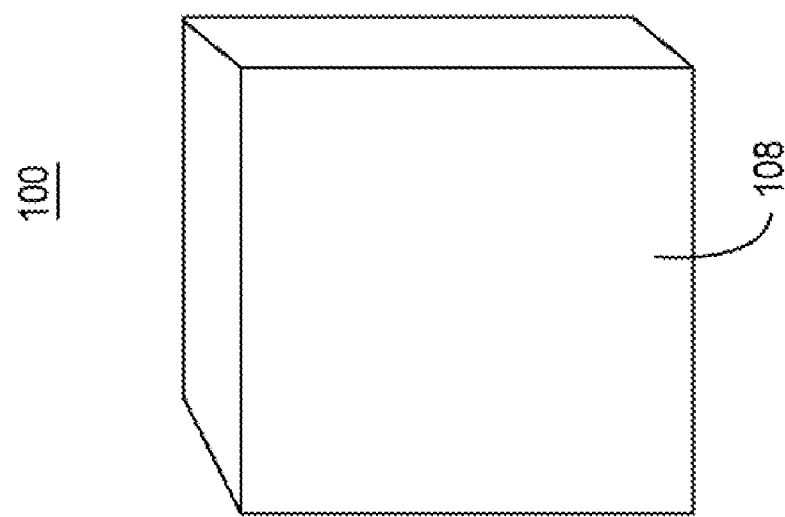
FIG. 1 depicts an embodiment of an exemplary security keypad in accordance with aspects of this disclosure.
Figure 1:
Figure 1:
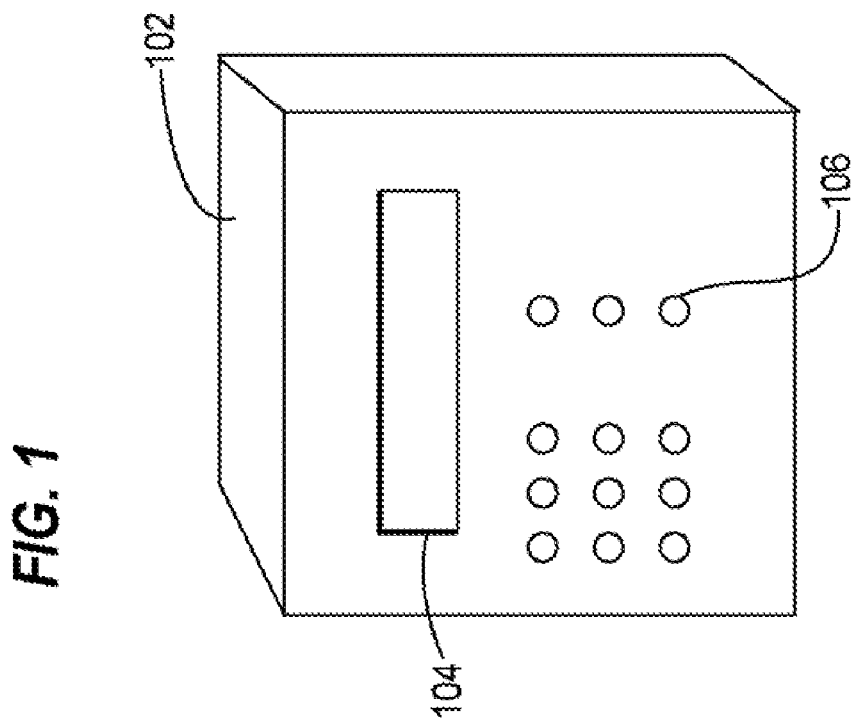

FIG. 1 depicts an embodiment of an exemplary security keypad system 100 in accordance with aspects of this disclosure. Security keypad system 100 includes a wireless keypad 102 and a control panel 108. The wireless keypad 102 includes a liquid crystal display ("LCD") (e.g., dual type information display) 104; and a user interface 106 (e.g., depicted as buttons for data input and/or response selection). Lead-line 110 demarcates a wireless communication path between keypad 102 and control panel 108.

A user is able to control a security system using the wireless keypad 102. However, when the wireless keypad 102 is not in a fixed location or in proximity to a fixed location the user is prevented from accessing a feature on the wireless keypad (e.g., the user is prevented from arming the alarm system). For example, when the wireless keypad 102 is not secured to the keypad wall mount bracket 108, the user will not be able to access the feature associated with arming the security system. The material disclosed herein reduced the number of retry attempts of a wireless transmission in order to preserve battery life and obtain a more reliable wireless communication. Instead of transmitting a message, a device (e.g., wireless keypad 102) listens to determine whether there are transmissions in progress by some other wireless component in the system. If another component is transmitting at that particular moment in time then the device will delay its own transmission until the other component is finished (which typically takes about a few milliseconds).

Figure 2:
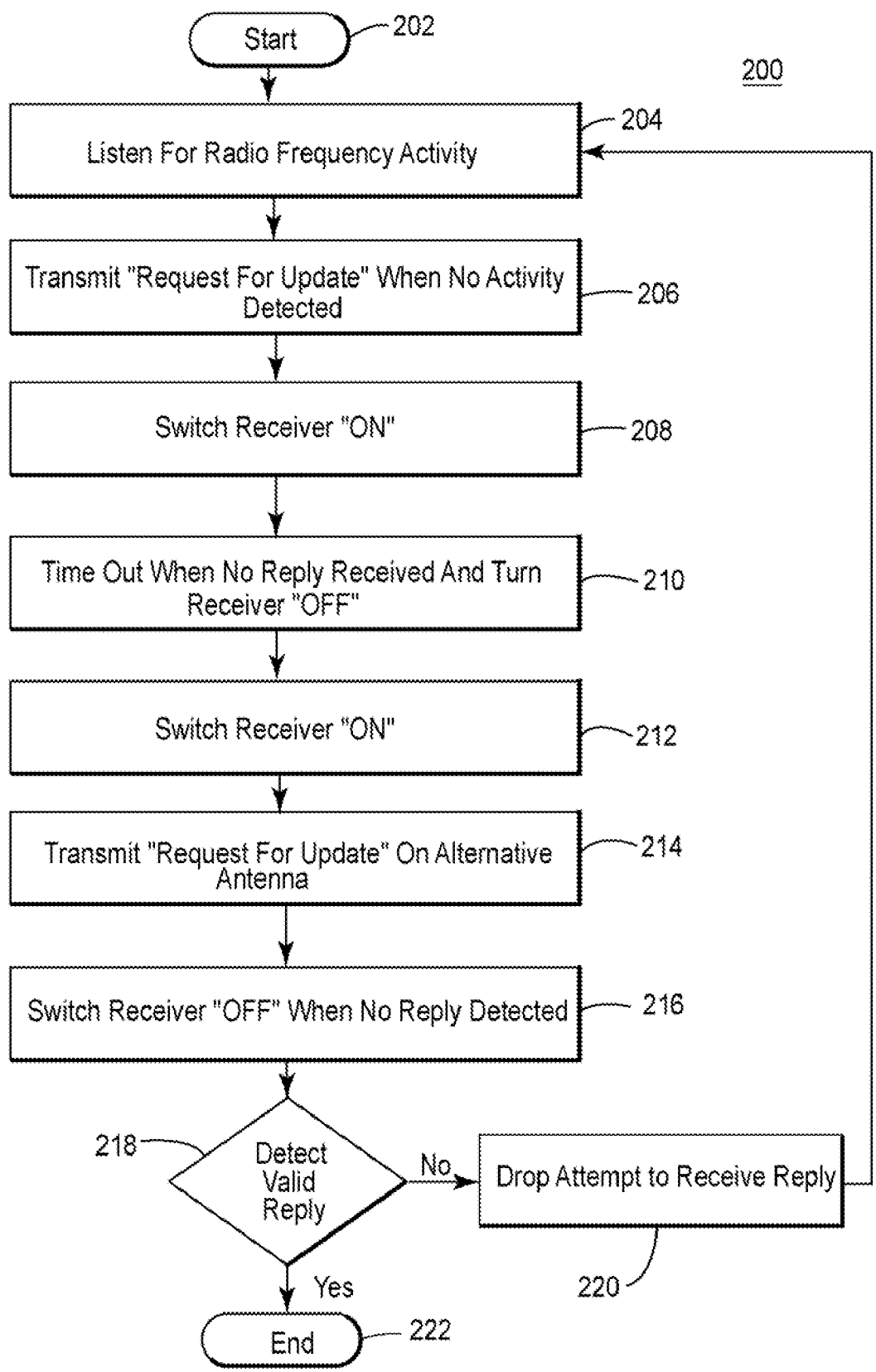
FIG. 2 depicts an embodiment of an exemplary method in accordance with aspects of this disclosure.
Figure 4:
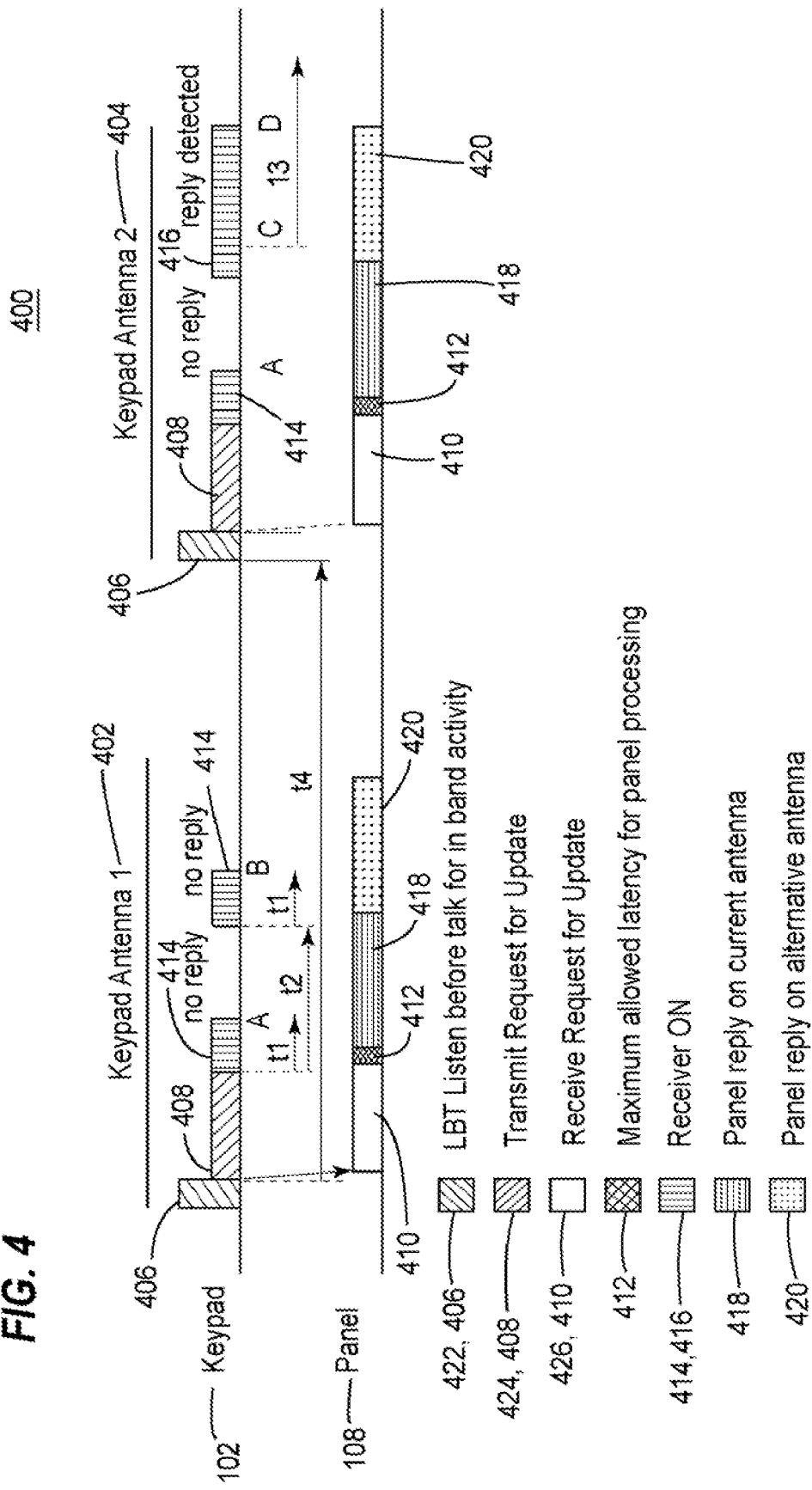
FIG. 4 depicts an embodiment of a transmission model in accordance with aspects of this disclosure.

FIG. 2 depicts an embodiment of an exemplary method 200 in accordance with aspects of this disclosure. FIG. 4 depicts an exemplary application of the method 200 depicted in FIG. 2 in accordance with aspects disclosed herein. Specifically, FIG. 4 depicts an embodiment of a timeline 400 using the exemplary method depicted in FIG. 2. FIG. 4 also includes a legend explaining aspects of the timeline 400. For easier understanding, a reader is encouraged to simultaneously view FIGS. 2 and 4.

Returning to FIG. 2, the method 200 begins at step 202 and proceeds to step 204. At step 204, the keypad 102, using antenna 1 402, listens for RF activity (see also keypad state 406 of FIG. 4) from any other component (e.g., other keypad or sensor) (also referred to herein as "Listen Before Talk"). The keypad 102 periodically interrogates the panel 108 for a system state update of the panel 108 (i.e., to determine if the panel has changed state). Immediately after the keypad 102 determines that there is no RF activity, a timespan "t4" begins. After interrogation, the method 200 proceeds to step 206.

When no RF activity is detected, at step 206, the keypad 102 transmits a "Request_for_Update" message to the panel 108 using antenna 1. During transmission of the message, at step 206, the transmission state of the keypad 102 is illustratively depicted in FIG. 4 keypad state 408; and the transmission state of the panel 108 is depicted as panel state 410 (when the panel receives the "Request_for_Update" message). Thereafter, the method 200 proceeds to step 208.

At step 208, the keypad 102 immediately switches its receiver "ON" to receive a reply message from the panel 108. During step 208, keypad state 414, in FIG. 4, depicts the state of the keypad 102. When the keypad receiver is turned "ON," a timespan "t1" is initiated and begins a predetermined timespan for the keypad receiver to be turned "ON." During a portion of timespan t1, there is a latency 412, due to processing, in the panel 108. After the latency 412, the panel 108 transmits a reply message on the same antenna (e.g., panel antenna 1 (not shown)) used when the keypad's "Request_for_Update" message was received. The state of the panel 108 during transmission of the reply message is panel state 418. At the expiration of a first timespan t1 (depicted in FIG. 4 as point "A"), the method 200 proceeds to step 210.

At step 210, when no reply from the panel 108 has been received at point A, the keypad 102 times-out and switches the keypad receiver "OFF." A timespan "t2" begins at about the same time as timespan t1 with a duration less than the duration of the reply message (i.e., when the keypad receiver is turned ON) and ends prior to an initiation of a subsequent timespan also having a duration of t1. Thereafter, the method 200 proceeds to step 212.

The panel 108 transmits a reply multiple times (e.g., twice) using either antenna because the panel 108 doesn't know if the reply message was correctly received by the keypad 102. The keypad only needs to listen for a reply until the correct reply is received, and doesn't need to retransmit to the panel 108. As a result, power is saved at the keypad 102.

After timespan t2 (i.e., at step 212), another timespan t1 begins and the keypad 102 switches the keypad receiver ON again. Following the transmission of a first reply message by the panel 108, panel 108 transmits a second reply using the panel's alternative antenna. Transmission of the second reply message begins shortly after the second timespan t1 begins.

At point B, when again no reply has been received from the panel 108, the keypad 102 switches off its receiver and waits for the retry timeout t4 period to elapse. After timeout t4, the keypad 102 transmits a second "Request_for_Update" message, now using its antenna2 404. In the full sequence of transmission of data between the keypad and the panel, FIG. 400 illustratively depicts a failure to receive a reply for the first three occasions (414 at point A or B) and a success receiving a reply at the last occasion 416.

When a valid sync of the reply message has been detected (e.g. when message address of receiver and destination match), at point C, the keypad receiver is NOT switched OFF, but continues to receive the panel reply message.

At point D, the entire panel reply message has been received. The keypad 102 receiver is switched off and a cyclic redundancy check is performed to validate and accept the message content of the message validates the reply. If no valid CRC was found, timeout t3 eventually drops the attempt to receive the reply. The sequence will repeat every t4 seconds.

A practical value for timeout t4 is 4 seconds, which implies that the panel will be able to inform the keypad about changes in the system state 2 seconds late on the average.

In various embodiments, there are multiple keypads (e.g., up 4 wireless keypads) and multiple I/O modules (e.g., up to 4 wireless I/O modules) communicating in a system depicted in FIGS. 2 and 4. Taking into account that wireless outdoor sirens and beacons will be constructed around the mentioned I/O modules, start of sounding and/or flashing will be 4 seconds late at the most.

Further, in various embodiments, the panel 108 changes antenna regularly, but never during reception of a request and subsequent transmission of a reply.

Figure 3:
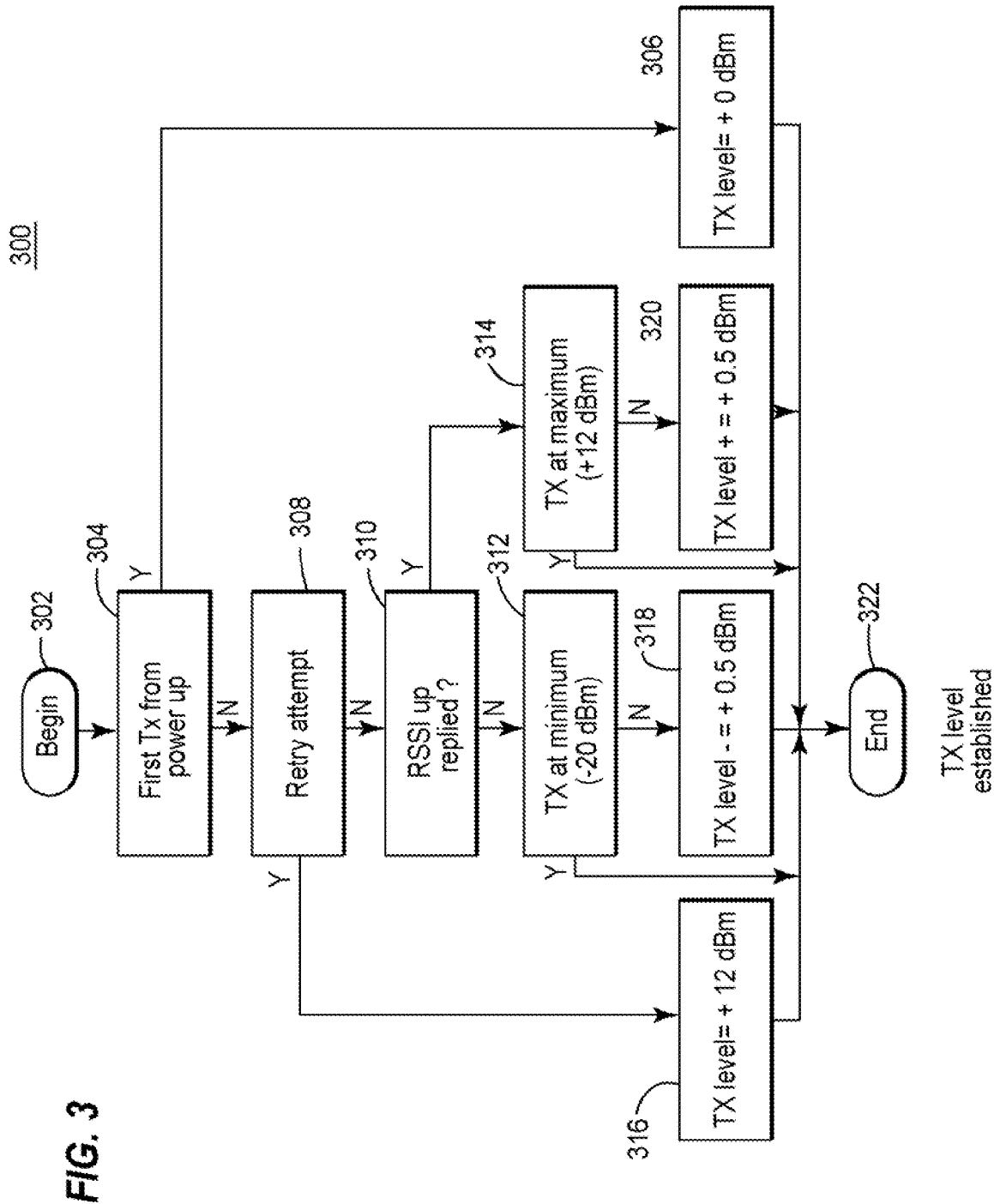
FIG. 3 depicts an embodiment of another exemplary method in accordance with aspects of this disclosure.

FIG. 3 depicts an embodiment of an exemplary method 300 for dynamic transmission power optimization in accordance with aspects of this disclosure. More specifically, in method 300 the control radio panel module 108 dynamically controls the transmission power level of keypad 102 and I/O module (not shown). As explained in greater detail below, the control radio panel module 108 returns a single bit in a reply message, indicating whether the keypad 102 should increase or decrease the transmission power level of a next transmission. Herein, the transmission power level is expressed in dBm. Generally, dBm is used and defined herein as an abbreviation for the power ratio in decibel (dB) of the measured power referenced to one milliwatt (mW).

The method 300 begins at step 302 when the keypad 102 is turned "on" and proceeds to step 304. At step 304 the method 300 queries whether this is the first transmission of the keypad 102. When the keypad 102 is turned "on" the keypad transmits a communications signal towards the control panel radio module 108. If, at step 302, it is the first time that the keypad 102 has been turned "ON" then there are no previous transmissions. At the first transmission, when the keypad 102 (or some other component in the system) is turned ON there is no history as to how loud (i.e., how strong) the keypad 102 (or other component) should transmit. If this is the first transmission by the keypad 102 (or other component) then the query at step 304 is answered affirmatively and the method 300 proceeds to step 306.

At step 306, the transmission level is set to 0 dBm (a factory setting). There is only one first transmission from power up. The transmission from power up will be transmitted at a level of 0 dBm and messages transmitted at this transmission level may fail (it may not be loud enough for the control panel radio module 108 to pick up that message and send an acknowledgement). Because of the low transmission level, the keypad 102 will not get an acknowledgement from the control panel radio module 108 on first power up. After step 306, the method 300 proceeds to and ends at step 322 where the transmission level is set for the next transmission.

If however, the query at step 304 is answered negatively, the method 300 proceeds to step 308. The query at step 304 is answered negatively when the keypad 102 (or other system component) had been previously powered up (i.e., sent a transmission).

At step 308, the method 300 queries whether the signal transmitted (e.g., by the keypad 102) is a retry attempt. If the query is answered affirmatively, the method proceeds to step 316.

At step 316 the transmission level of the signal transmitted by the keypad 102 is increased to the maximum transmission level (illustratively the maximum transmission level is described and depicted as +12 dBm) of the device 102. Thereafter the method 300 proceeds to and ends at step 322.

Returning to step 308. If a negative determination is made at step 308 (i.e., that the transmission attempt is not a retry attempt), the method 300 proceeds to step 310.

At step 310, the method 300 queries whether the signal strength indication flag as received from the control panel radio module 108 in the previous reply message of the panel indicates that the power level of the transmission signal transmitted by the keypad 102 should be increased. If the query at step 310 is answered affirmatively, the method 300 proceeds to step 314. If however, the query at step 310 is answered negatively, the method 300 proceeds to step 312.

Returning to step 310 the method 300 proceeds to step 314 when an affirmative determination is made at step 314. At step 314, the method 300 queries whether the transmission level of the keypad 102 is already at its maximum transmission level. For illustrative purposes only, step 314 is described and depicted as having a maximum value of +12 dBm. If the keypad is already at its maximum transmission level then the query at step 314 is answered affirmatively and proceeds to step 322.

If however, the query at step 314 is answered negatively, the method 300 proceeds to step 320. At step 320 the transmission level of the keypad 102 is given an incremental increase (e.g., an increase of about +0.5 dBm). Thereafter, the method 300 proceeds to step 322.

Returning to step 310. If a negative determination is made at step 310 (i.e., that the single bit in the reply message from the control panel radio module 108 did not indicate that the transmit level should be increased), the method 300 proceeds to step 312. Step 312 queries whether the transmission level of the keypad 102 is at its minimum transmission level (e.g., −20 dBm). Illustratively FIG. 3 depicts the minimum transmission level of the keypad 102 as −20 dBm. However, that depiction is for illustrative purposes only and not intended in any way to limit the scope of the invention.

If the query at step 312 is answered affirmatively then the transmission level cannot be reduced further. As such, upon an affirmative determination at step 312, the method 300 proceeds to step 322.

If however, the query at step 312 is answered negatively then the transmission level of the keypad 102 is not at its minimum transmission level and can be lowered. As such, upon a negative determination at step 312, the method 300 proceeds to step 318.

At step 318 the transmission level of the keypad 102 is given an incremental decrease (e.g., an incremental decrease of about 0.5 dBm). Thereafter, the method 300 proceeds to and ends at step 322.

Figure 5:
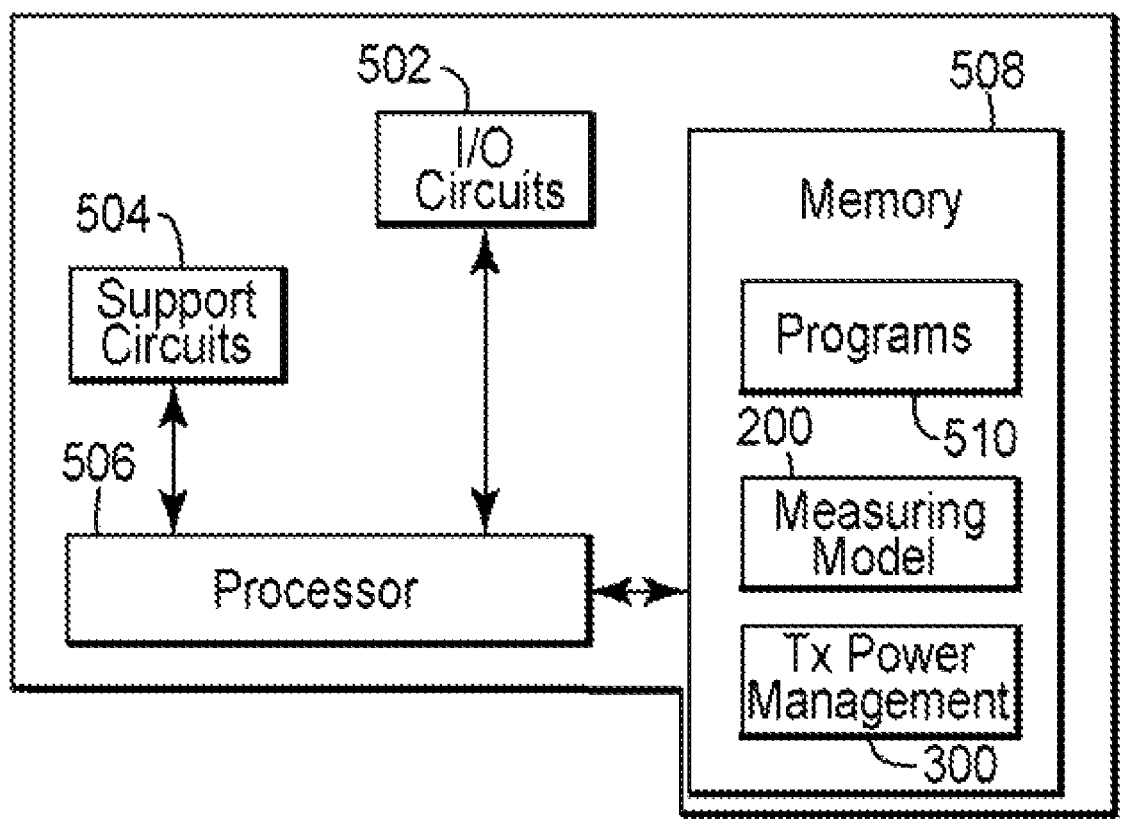
FIG. 5 depicts a high-level block diagram of a computer architecture in accordance with aspects of this disclosure.

FIG. 5 depicts a high level block diagram of an embodiment of a controller 500, as part of electronic circuitry, suitable for use in performing the methods and model disclosed above and depicted in FIGS. 2, 3, and 4. The controller 500 of FIG. 5 comprises a processor 506 as well as a memory 508 for storing control programs 510 and the like. In addition, the memory 508 can also store the transmission power level management module (as explained above in regarding FIG. 3) and/or messaging model module (as explained above regarding FIGS. 2 and 4. The processor 506 cooperates with conventional support circuitry 404 such as power supplies, clock circuits, cache memory and the like as well as circuits that assist in executing the software routines stored in the memory 508. As such, it is contemplated that some of the process steps discussed herein as software processes may be implemented within hardware, for example, as circuitry that cooperates with the processor 506 to perform various steps. The controller 500 also contains input-output circuitry 502 that forms an interface between the various functional elements communicating with the controller 500.

Although the controller 500 of FIG. 5 is depicted as a general-purpose computer that is programmed to perform various control functions in accordance with the present invention, the invention can be implemented in hardware, for example, as an application specified integrated circuit (ASIC). As such, the process steps described herein are intended to be broadly interpreted as being equivalently performed by software, hardware, or a combination thereof.

While the foregoing is directed to embodiments of the present invention, other and further embodiments of the invention may be devised without departing from the basic scope thereof, and the scope thereof is determined by the claims that follow.

The invention claimed is:

1. A method of establishing wireless communication between a first device and a second device, the method comprising:
   listening at the first device for radio frequency ("RF") activity on a receiver utilizing a first antenna;
   transmitting from the first device a command utilizing the first antenna when no RF activity is detected;
   switching the receiver "on" after the transmission to listen for a reply from the second device;
   turning the receiver "off" if the receiver does not receive a reply within a first time span;
   switching the receiver back "on" to again listen for the reply from the second device;
   if no reply is received before an end of a predetermined period, attempting a retry of establishing communication with the second device by transmitting a command using at least one of a different antenna and a different transmit power level;
   switch the receiver "on" to listen for a reply by the second device to the retry transmitted command; and
   switching the receiver "off" if no reply from the second device is received.

2. The method of claim 1, wherein the receiver comprises a security device and the command comprises a "Request_for_Update."

3. The method of claim 1 and further comprising:
   determining whether the first device is turned "on" for a first time, is attempting a retry, or has already established communication with the second device; and
   transmitting at a power level depending on whether the transmitting is a first time transmission, a retry transmission, or a transmission after a reply has been received from the second device.

4. The method of claim 3, wherein an initial power level is selected if the first device is sending a first time transmission.

5. The method of claim 4, wherein a maximum power level is selected if the first device is sending a retry transmission.

6. The method of claim 3, wherein the power level is adjusted for transmissions after a reply has been received from the second device based upon received signal strength data provided by the second device in the reply.

7. The method of claim 6, wherein adjustment of the power level comprises one of reducing the power level by about 5 decibels and increasing the power level by about 5 decibels.

* * * * *